UNITED STATES PATENT OFFICE.

GEORGE MUNGER, OF NEW HAVEN, CONNECTICUT.

IMPROVED WRITING-TABLET.

Specification forming part of Letters Patent No. 25,576, dated September 27, 1859; Reissue No. 2,252, dated May 22, 1866.

*To all whom it may concern:*

Be it known that I, GEORGE MUNGER, of New Haven, in the county of New Haven and State of Connecticut, have invented a new and Improved Writing-Tablet; and I do hereby declare that the following is a full, clear, and exact description thereof, which will enable those skilled in the art to make and use the same.

This invention consists in a writing-tablet prepared of an argillaceous-surfaced wood slate, which is formed by uniting two or more layers of veneering or thin wood together, and then coating the exterior surface of the compact mass with a composition of slate, emery, or other similar argillaceous material in such a manner that a new article of manufacture is produced, which can be furnished very cheap, which cannot be broken by a fall, and which will present as good a surface for marking upon as the most finished solid argillaceous article, being not liable to crack or warp by expansion and contraction, which is prevented by the use of two or more layers of wood.

In constructing my slate I unite two or more layers of wood to each other by glue or other adhesive substance, so as to form a single compact plate. These layers are to be adjusted by preference in such a manner that the grain or fiber of the wood shall run in different directions in either of the adjacent plates or layers, so that the contraction or expansion of each of the layers may be more effectually counteracted by that of the adjacent layer or layers than it will be if the fibers or grains of all the layers run in one and the same direction.

A plate thus constructed may be preserved free from warps or cracks, and when ready-made it is covered with a composition of slate, emery, or other materials put on in a liquid state, which, when dry and hardened, shall form a surface on which marks can be made by a slate or soapstone pencil as on an ordinary slate.

What I claim as new, and desire to secure by Letters Patent, is—

A new article of manufacture, to wit: an argillaceous-surfaced wood writing-slate, which is formed by uniting two or more layers of veneering or thin wood, and then coating the exterior surfaces of the compact mass with a composition of slate, emery, or other similar argillaceous material, substantially as and for the purposes set forth.

GEO. MUNGER.

M. M. LIVINGSTON,
W. HAUFF.